April 16, 1963 H. GUMIN ETAL 3,086,125

GATED AMPLIFIER INCLUDING TIMING PULSES AND SATURATION EFFECT TO EFFECT DELAY

Filed Oct. 30, 1956 2 Sheets-Sheet 1

Inventors
Heinz Gumin
Helmut Weber
By [signature]
Att'y.

April 16, 1963 H. GUMIN ETAL 3,086,125

GATED AMPLIFIER INCLUDING TIMING PULSES AND SATURATION EFFECT TO EFFECT DELAY

Filed Oct. 30, 1956 2 Sheets-Sheet 2

INVENTORS
Heinz Gumin &
Helmut Weber
BY
Att'y.

3,086,125

GATED AMPLIFIER INCLUDING TIMING PULSES AND SATURATION EFFECT TO EFFECT DELAY

Heinz Gumin, Munich, and Helmut Weber, Munich-Grosshadern, Germany, assignors to Siemens & Halske Aktiengesellschaft Berlin and Munich, a corporation of Germany Filed Oct. 30, 1956, Ser. No. 619,332
Claims priority, application Germany Nov. 11, 1955
5 Claims. (Cl. 307—88.5)

The present invention is concerned with a digital computer. This designation is intended to refer generally to a machine for processing or computing intelligence, that is to say, a machine for processing according to a predetermined scheme and for a desired purpose, messages or information that may be available, for example, in coded form; the term "computer" accordingly also embraces calculating machines in connection with which the information to be processed consists predominantly of numbers.

The coding of messages is in digital computers effected by allotting to each element (letter or number) of an information, as a code, respectively an impulse or no impulse or a combination of impulses and suppressed impulses. In the case of a so-called series machine, successive impulse trains or impulse series are processed, all impulses or impulse gaps alloted to the individual elements being present successively as to time and being as a rule processed accordingly.

Essential parts of a computer are the so-called gates. A gate is, generally speaking, a circuit which realizes logical ramifications, for example, by representing logical concepts such as "and," "or" etc. by a combination of preferably passive circuit elements. A very large number of such gates is used in an individual computer machine including, for example, a calculating machine. The expenditure for the individual gates therefore must be kept as low as possible.

Since a certain energy component of the impulses passing a gate is lost—it being immaterial whether a coincidence gate or a mixing gate or a blocking gate is involved—each gate is generally provided with an amplifier which imparts to the output impulse its full energy content. In accordance with a prior proposal, the amplifier may if desired be so dimensioned regarding its capacity that, as seen from its output, a plurality of further gates may be operated in parallel.

As the repeat impulse frequency of a gate, and therewith of the impulses passing through the transistor, should be as great as possible, it has been proposed to use for the amplification of the output impulses of a gate, the amplifying effect of a transistor operating preferably in base circuit. The use of a transistor amplifier provides known advantages; the entire construction of an individual gate with serially connected amplifier element becomes simpler and less expensive and the corresponding arrangement requires less space. In addition, the life of a transistor, especially a junction transistor, is practically unlimited, and it will hardly be necessary to compensate for losses caused, for example, by heating requirements, which are dissipated in the form of heat. A certain disadvantage of semiconductor amplifiers resides, however, in the fact that the intervals required for starting are already, at impulse repeat frequencies of a few hundred kilocycles, on the order of magnitude of the length of the individual impulses.

The object of the invention is to eliminate this disadvantage because individual impulses or whole impulse series could otherwise be suppressed in the series operation of several gates. In order to avoid the explained disadvantages, in connection with a computer with gate circuits respectively followed by a semiconductor amplifier, for example, a transistor amplifier, the invention proposes to connect and to control the amplifier in such a manner that the impulses passing through the gates are expanded at least by an amount equivalent to the interval of rise of the leading flank. The information impulses fed to the gate are individually or collectively brought to coincidence with a timing pulse, whether or not the kind of gate would require such operation, whereby those of the impulses fed to the gate which correspond in shape to the timing pulses are eliminated. Use is thereby made of the effect of the storage of charge carriers in semi-conductor amplifier elements, which is operative upon driving to the saturation region resulting in prolonging (lengthening) the amplified impulses.

The possibility could of course be considered, to regenerate the impulses leaving the output of each gate or the amplifier succeeding such gate. However, this would require considerable expenditure so far as further switching elements are concerned, which would largely cancel the advantages resulting from the use of transistors.

The various objects and features of the invention will now be explained with reference to the accompanying drawing, in which FIG. 1 shows explanatory curves;

The invention proceeds from the thought that the form or shape of the impulses leaving a gate is as such wholly immaterial, but that these impulses, if they are to assume some control function in a further gate or if they are to start a semiconductor amplifier again, must have a specific predetermined shape so that they may serve definite operations. For this reason, the invention proposes to bring an impulse which leaves gate distorted and expanded, to the input of a further gate in coincidence with a timing pulse, so that, in accordance with the concept of coincidence, a corrected impulse becomes operative which has exactly the shape corresponding to a timing pulse.

If it were attempted to carry out this regeneration of the input impulses of the individual gates without expanding these impulses in the respectively preceding gates, such impulses would in each case be shortened by the amount of the rise thereof, so that they would be completely suppressed after passing through a few gates. This will be now explained with reference to FIG. 1.

Figure 1:
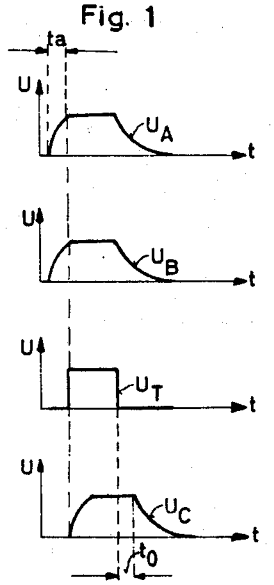

It shall be assumed that impulses at the inputs of a gate have a voltage function such as shown in the first two lines of FIG. 1. These impulses, before reaching the input of the respective gate have previously passed a gate with successively connected transistor amplifier. The rising flank of the impulses therefore is somewhat distorted. The time that is required until the impulse reaches its full voltage value, is indicated by $ta$ and shall be referred to as the "rise interval." The impulses are in accordance with the invention correspondingly lengthened or expanded by an amount $t_0$. These impulses are, within a succeeding gate, brought to coincidence with a timing pulse such as shown in the third line of FIG. 1, thereby producing impulses of the shape of the timing pulse. The timing pulse used for coincidence must be somewhat shifted as to time, by a certain amount, with respect to the impulse to be corrected; for, if its rising flank would lie exactly under the rise of the control impulse, an impulse would be produced after coincidence occurrence which would be narrowed by the time of rise $ta$.

When the corrected impulse is conducted to a further gate, which shall also be assumed to comprise a semiconductor amplifier, there will appear at the output of such gate an impulse such as is shown in the fourth line of FIG. 1. As will be seen, this impulse as compared with the timing pulse is lengthened or expanded again by the time interval $t_0$. This interval is somewhat greater than the time interval $ta$ and in a border case must correspond thereto.

The lengthening of an impulse at the output side of a gate, may, in accordance with another feature of the invention, be achieved by suitable dimensioning and circuitry of the semiconductor amplifier to be used, so as to effect operation of the transistor so far toward saturation, that the collector current is, as to time, fully maintained by a definite amount even after decay of the control impulse.

Figure 2:
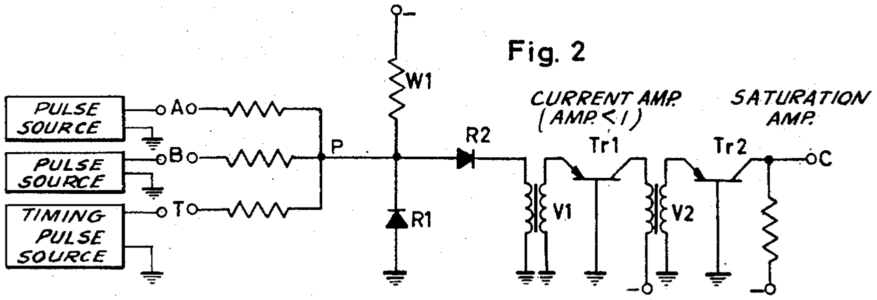
FIG. 2 shows as an example of the invention a coincidence gate.

FIG. 2 illustrates as an example a coincidence gate for use in an intelligence processing machine according to the invention. Impulse trains or series are respectively fed to the gate by way of the terminals A and B; the object is to ascertain coincidence of the individual impulses of these series. In accordance with the invention, a timing impulse T is also fed to the gate which blocks out rectangular impulses (see FIG. 1) from the correspondingly distorted impulses conducted to the terminals A and B.

The operation is, briefly explained, as follows:

So long as there is no impulse on the input terminals A and B, a transverse current will flow in the circuit including rectifier R1 and resistor W1. The point P will be approximately at ground potential. An impulse arriving at one of the three input terminals will flow over the corresponding input resistor and resistor W1 to negative battery. The circuit is so dimensioned that the potential at point P will be sufficiently raised only at times when impulses arrive simultaneously at the three input terminals so that a current of a magnitude corresponding to the current of an individual impulse can flow over the rectifier R2 and the primary winding of transformer V1. The transformer V1 increases the current highly, for example, in a ratio of 1:4 and transmits the correspondingly amplified current to the emitter of the successively or serially connected transistor Tr1. The collector of this transistor is connected with another transformer V2 which amplifies the collector current, for example, again by a fourfold amount. This high amplification is sufficient for operating the second transistor Tr2 to saturation even in the case of loading by three succesively connected gates. Due to inertia, the transistor then remains in saturated condition, that is for a time $t_0$ (FIG. 1), even if the potential at point P should have again broken down.

A blocking gate has been proposed previously, in which the blocking input is directly connected to a succeeding semiconductor amplifier for controlling such amplifier, for example, a transistor, upon appearance of a control impulse, in such a manner as to block the amplifier completely, so that no impulses will appear at the output even if control impulses should be conducted thereto. In the previous proposal, this is achieved in simple manner by biasing the base of a transistor positively to such an extent that no current can flow in the emitter circuit.

It is of course possible in connection with such a blocking gate, to bring to coincidence with a timing pulse, which may have to have a definite position as to time, the input impulses of each individual input, as explained with reference to FIG. 2. In accordance with another object and feature of the invention, the blocking input or inputs are not controlled by impulses of the shape of timing pulses, but the correspondingly distorted pulses are directly connected to the blocking input, such pulses being, as is apparent from FIG. 1, of much greater time-magnitude than the timing pulse. The blocking impulse therefore becomes operative sooner by the time of rise $ta$ and is furthermore present for an interval extended by the time $t_0-ta$, that is, it is present longer, by this time, than the logical product of the impulse to be blocked and the timing pulse. The blocking gate operates for this reason particularly reliably.

Figure 3:
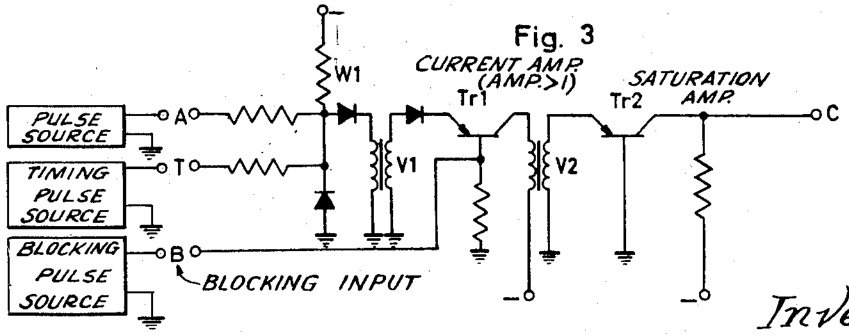
FIG. 3 shows a blocking gate according to the invention.

FIG. 3 shows a blocking gate of this kind. The blocking input B is directly connected to the base of transistor Tr1. The impulses occurring on the input or inputs of the blocking gate, which are to be blocked, are again brought to coincidence with a timing pulse. Accordingly, if the blocking input is not made effective, a definite rectangular impulse will be available to the gate. The gate is in other respects constructed as explained with reference to FIG. 2.

The time of rise of the individual impulses at the transistor amplifier causes together with the lengthening or expansion of the impulses a certain time delay of the impulses which by itself is entirely tolerable. In a transistor type with a limit frequency amounting to 1.2 mc., rise times of the transistor amplifier have been measured amounting to 1.25 μsec., which in case of an impulse repeat frequency of 200 kc. amounts to one fourth of the impulse spacing (=5 μsec.). The individual impulses therefore must be shifted by a definite amount. The shifting can of course be greater than the time of rise. This time delay must evidently be considered in constructing a machine requiring a great number of such gates, quite apart from the fact that a series of timing pulses must be provided which mutually exhibit this shifting as to time. It is suitable, in case of an impulse repeat frequency of 200 kc., to provide four timing pulses which are one relative to the other shifted by one fourth of the impulse spacing. Timing pulses shifted by one fourth impulse spacing are thereby respectively used from gate to gate for the coincidence operation.

Figure 4:
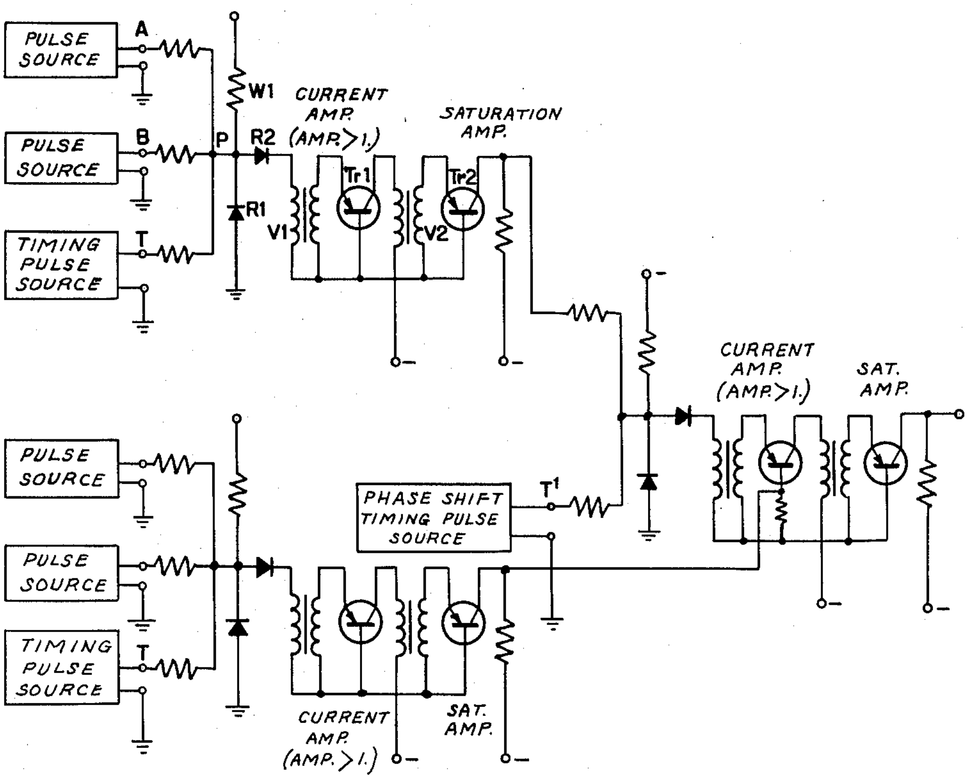
FIG. 4 shows two gate circuits with amplifiers serially disposed with respect thereto.

The arrangement shown in FIG. 4, comprising two gate circuits with amplifiers serially disposed with respect thereto will be readily understood in light of the foregoing explanations.

The invention has been described in connection with a coincidence gate and a blocking gate, respectively. The conditions in a mixing gate are similar. A timing pulse may be alloted to each individual mixing gate input or else, coincidence may be brought about with a timing pulse at the output, before a successive amplifier becomes operative. The invention is not inherently limited to machines in which transistors are employed, but may be used in all circumstances in which the amplifier elements following the individual gates cause a certain delay based upon their physical conditions. It is thus feasible to use the invention analogously in machines employing electrostatic amplifiers, that is, amplifiers with voltage-dependent dielectric. The invention may also be advantageously used with machines employing amplifier tubes, for example, in cases requiring the processing of high impulse repeat frequencies.

Changes may be made within the scope and spirit of the appended claims.

We claim:

1. A circuit arrangement for processing information impulses which are available in the form of a series of impulses, comprising a plurality of successively disposed gate circuits, means for supplying to the first one of said gate circuits an impulse series comprising the information impulses, means for supplying to the respective gate circuits a plurality of mutually phase shifted timing pulses, an amplifier successively connected with each of said gate circuits for receiving therefrom said impulse series and said timing pulses supplied thereto, means for connecting the output of each amplifier with the input of the respective succeeding gate, said amplifiers each operating in its saturation range and respectively effecting lengthening of the impulses of the impulse series received, by an amount corresponding at least to the rise of the leading flanks thereof, each of said lengthened impulses being respectively in coincidence with one of said phase shifted timing pulses, said last named impulses being phase shifted with respect to the timing pulses of the respectively preceding gate circuit by an amount corresponding at least to the time of rise of the leading flanks of the impulses of said impulse series, the output impulses which are thereby produced corresponding in shape to the shape of said timing pulses.

2. A computer according to claim 1, wherein said amplifier is a transistor amplifier, and wherein said impulse-lengthening is effected by said transistor amplifier in the operation thereof within its saturation range.

3. A circuit arrangement according to claim 2, wherein said transistor amplifier comprises a first transistor having a current amplification greater than 1, and a second transistor controlled by said first transistor to operate within saturation range as a result of said current amplification exceeding 1.

4. A computer according to claim 2, comprising a transformer having a primary winding connected with the output of said gate, and means for connecting said transistor amplifier with the secondary winding of said transformer, the number of turns of said primary winding exceeding the number of turns of the secondary winding, whereby the primary current is amplified causing the transistor connected with the secondary winding to operate within the saturation range.

5. A computer according to claim 4, comprising a further transistor amplifier serially related to said first named transistor amplifier, a further transformer having a primary winding connected with the output of said first named transistor amplifier, and means for connecting the secondary winding of said further transformer with said further transistor amplifier, the number of turns of the primary winding of said further transformer exceeding the number of turns of the secondary winding thereof, whereby the primary current is amplified to cause the further transistor connected with the secondary winding to operate within the saturation range.

References Cited in the file of this patent

UNITED STATES PATENTS

| | | |
|---|---|---|
| 2,627,039 | MacWilliams | Jan. 27, 1953 |
| 2,647,957 | Mallinckrodt | Aug. 4, 1953 |
| 2,670,445 | Felker | Feb. 23, 1954 |
| 2,695,381 | Darling | Nov. 23, 1954 |
| 2,760,087 | Felker | Apr. 21, 1956 |
| 2,803,758 | Whitenack | Aug. 20, 1957 |
| 2,838,686 | Eckert | June 10, 1958 |
| 2,849,626 | Klapp | Aug. 26, 1958 |
| 2,943,264 | Anderson | June 28, 1960 |

FOREIGN PATENTS

| | | |
|---|---|---|
| 714,746 | Great Britain | Sept. 1, 1954 |

OTHER REFERENCES

Chaplin, The Transistor Regenerative Amplifier as a Computer Element; Proceedings of the Institution of Elect. Eng., vol. 101, part III, No. 73, pp. 298–307, October 1954.